Patented Feb. 7, 1939

2,146,598

UNITED STATES PATENT OFFICE 2,146,598

RESINOUS COMPOSITION AND PRODUCT COATED THEREWITH

Arthur J. Sherburne, Alplaus, N. Y., assignor to General Electric Company, a corporation of New York No Drawing. Application July 1, 1936, Serial No. 88,384

10 Claims. (Cl. 91—68)

This invention relates broadly to a new and useful resinous composition and to products coated with the same. More particularly the invention relates to, and has as an object to provide an improved resinous coating and finishing varnish, and varnished products coated therewith. The invention is especially directed to the production of varnished textile and other fibrous materials (e. g., cloth, paper and the like) having the desirable electrical and physical properties of the known black varnished sheet materials and the high degree of oil resistance and toughness of clear varnished sheet products.

The present invention utilizes resinous materials composed chiefly of highly oxidized abietic acid and other resin acids, but also containing smaller amounts of polyphenols, unoxidized abietic acid and certain unidentified products that are probably of a ligneous nature. Examples of such resinous materials are products known to the trade as "Vinsol" resins. More specifically it may be stated that "Vinsol" resins comprise pine wood pitch obtained by the extraction of pine wood, which pitch comprises oxidized resin acids, oxidized terpenes, polyphenols and polymerized terpenes. The term "resin comprising oxidized abietic acid" as used in the following specification and appended claims includes within its meaning a material such as just described. "Vinsol" resins are oil resistant and have unusually low power factor rise with increase in temperature ranging, for example, from about 0.5 per cent at 25° C. to about 15.2 per cent at 103° C. However, varnishes containing drying oils and resins comprising highly oxidized abietic acid, as heretofore made, have been either too tacky or too brittle and, further, have been low in resistance to aging, moisture and to various chemicals.

The important properties of varnished cloth for electrical use are low power factor and low power factor rise with increase in temperature, dielectric strength above 1000 volts per mil, resistance to oil, moisture and aging, smoothness or slip, hardness of film and flexibility. The known black varnished cloths are too soft and are not sufficiently resistant to oil. The best clear varnished cloths heretofore known to the art have been too high in power factor, too low in dielectric strength and relatively poor in resistance to aging and moisture.

The resinous composition of this invention provides a varnished cloth that not only has power-factor characteristics equal or superior to the best known clear or black varnished cloths but that also has satisfactory flexibility, hardness and dielectric strength and is highly resistant to oil, moisture and aging.

By extensive research and experimental work it has been found that by incorporating a certain amount of an oil-soluble phenol-aldehyde resin in a varnish containing a resin comprising highly oxidized abietic acid (e. g., "Vinsol" resin) and a drying oil, there is obtained a varnish which, upon evaporation of solvent at, for example, a baking temperature, forms a film having an extraordinarily high degree of toughness and resistance to heat.

In carrying my invention into effect, the starting materials include a resin of the oil-soluble phenol-aldehyde type, a resin comprising highly oxidized abietic acid, drying oil (advantageously a mixture of raw China-wood oil and heat-polymerized linseed oil), volatile solvent and, preferably also, a drier. In a formula wherein such materials are used, the oxidized abietic-acid resin aids in forming a quick-drying film having a hard, smooth surface and, particularly, provides a film of improved electrical properties. The combination of this resin with an oil-soluble phenol-aldehyde resin, and the particular ratio of the two resins to total oil content of the composition, adds hardness, toughness and flexibility to the film and, also, favorably influences its resistance to aging. The China-wood oil aids in giving toughness and water resistance to the film, and accelerates its drying. The heat-polymerized linseed oil improves the flexibility and age-resisting properties of the film.

In order that this invention may be more completely understood by those skilled in the art, the following specific example is given for purpose of illustration:

*Example 1*

Parts by weight
Oil-soluble phenol-aldehyde resin_____ 1.4
Resin comprising oxidized abietic acid_____ 4.2
China-wood oil_____ 30.4
Heat-polymerized linseed oil_____ 13.9
Drier_____ 0.3
Volatile solvent_____ 49.3

The two resins mentioned in the formula are heated with about one-fourth of the total amount of raw China-wood oil to and at a temperature of about 230°–235° C. until the resins and oil are homogeneously combined or blended, as shown by a pill or drop of the base remaining clear when cooled on a metal plate. The remainder of the China-wood oil is then added and cooking continued at 230°–235° C. until the varnish forms a string on testing. The heat-polymerized linseed oil is added and stirred thoroughly, maintaining the cooking temperature of 230°–235° C. until a thin string can be drawn.

The resinous composition produced in the manner described is rapidly cooled and then thinned with any suitable solvent (e. g., turpentine, coal tar solvents, petroleum hydrocarbon solvents, et cetera). Advantageously, from an economical standpoint, the resinous composition or base may be thinned with a petroleum hydrocarbon solvent such as a petroleum naphtha or a gasoline of, for instance, about 55° A. P. I. gravity. The resultant product is clarified by centrifuging. The drier either may be incorporated with the solvent and thus added to the previously mixed components, or, if desired, it may be added to the thinned base.

The production of an improved cloth coating and finishing varnish is not limited to the particular percentage proportions of the stated ingredients as hereinbefore given, for the components may be varied within the following limits without material change in properties of the dried varnish film:

| | Parts by weight (approximately) |
|---|---|
| Oil-soluble phenol-aldehyde resin | 4 – 1 |
| Resin comprising oxidized abietic acid | 2 – 5 |
| China-wood oil | 25 –35 |
| Heat-polymerized linseed oil | 12 –16 |
| Drier | 0.2– 1 |
| Volatile solvent | 56.8–42 |

In practicing this invention China-wood oil, if desired, may be substituted for heat-polymerized linseed oil without material increase in the power factor of a dried film of the composition. Drying oils other than China-wood and linseed oils, for example, soya bean oil, perilla oil and the like, either raw or heat-polymerized, may also be employed.

Any suitable drier and in any convenient form may be used, for example, various calcium, lead, manganese and cobalt driers such as, for instance, calcium resinate, lead resinate, lead naphthenate, and the like. The percentage of drier required may be varied to suit manufacturing requirements for producing dry cloth or other material in a minimum of time. Or, if desired, the drier may be omitted.

The method of combining the various ingredients may be varied in many ways. For example, the temperature and time of heating required for obtaining a particular end-product may be varied in accordance with differences in the properties of the starting materials.

The liquid coating composition produced by this invention is applied to textile or other fibrous materials (e. g., cloth, paper and the like), or to any other material requiring a coating of the kind described, by brushing, sprinkling, spraying, or immersion means and under temperature and other conditions well known to those skilled in the art. Upon heating the coated material at a temperature of about 110° C. or thereabove, the solvent is evaporated and a product having the improved properties hereinbefore stated is obtained.

Although in all references herein to the resin which I describe as "comprising highly oxidized abietic acid" I have particularly in mind those products known to the trade as "Vinsol" resins, it is to be understood that any resinous product or products having electrical and other properties substantially the same as, or the equivalent of, "Vinsol" resins may be employed.

What I claim as new and desire to secure by Letters Patent of the United States, is:—

1. A liquid coating composition comprising a volatile solvent having dissolved therein a mass comprising, by weight, from approximately 1 to 4 parts of oil-soluble phenol-aldehyde resin, from approximately 2 to 5 parts of resin comprising oxidized abietic acid, and from approximately 37 to 51 parts of drying oil.

2. A liquid coating composition comprising the following ingredients approximately in the parts by weight and within the limits specified:

| | Parts by weight |
|---|---|
| Oil-soluble phenol-aldehyde resin | 4 – 1 |
| Resin comprising oxidized abietic acid | 2 – 5 |
| China-wood oil | 25 –35 |
| Heat-polymerized linseed oil | 12 –16 |
| Drier | 0.2– 1 |
| Volatile solvent | 56.8–42 |

3. A liquid coating composition comprising the following ingredients in the approximate parts by weight specified:

| | Parts by weight |
|---|---|
| Oil-soluble phenol-aldehyde resin | 1.4 |
| Resin comprising oxidized abietic acid | 4.2 |
| China-wood oil | 30.4 |
| Heat-polymerized linseed oil | 13.9 |
| Drier | 0.3 |
| Volatile solvent | 49.8 |

4. In an article of manufacture the combination of a base with a dried varnish film comprising, by weight, from approximately 1 to 4 parts of oil-soluble phenol-aldehyde resin, from approximately 2 to 5 parts of resin comprising oxidized abietic acid, and from approximately 37 to 51 parts of drying oil.

5. A flexible sheet material coated with a dried varnish film comprising, by weight, from approximately 1 to 4 parts of oil-soluble phenol-aldehyde resin, from approximately 2 to 5 parts of resin comprising oxidized abietic acid, and from approximately 37 to 51 parts of drying oil.

6. An article of manufacture comprising dried and solvent-free cloth initially impregnated with a coating composition comprising the following ingredients approximately in the parts by weight and within the limits specified:

| | Parts by weight |
|---|---|
| Oil-soluble phenol-aldehyde resin | 4 – 1 |
| Resin comprising oxidized abietic acid | 2 – 5 |
| China-wood oil | 25 –35 |
| Heat-polymerized linseed oil | 12 –16 |
| Drier | 0.2– 1 |
| Volatile solvent | 56.8–42 |

7. An insulating tape comprising a dried and solvent-free band of cloth initially impregnated with a coating composition comprising the following ingredients in the approximate parts by weight specified:

| | Parts by weight |
|---|---|
| Oil-soluble phenol-aldehyde resin | 1.4 |
| Resin comprising oxidized abietic acid | 4.2 |
| China-wood oil | 30.4 |
| Heat-polymerized linseed oil | 13.9 |
| Drier | 0.3 |
| Volatile solvent | 49.8 |

8. A resinous composition comprising, by weight, from approximately 1 to 4 parts of oil-soluble phenol-aldehyde resin, from approximately 2 to 5 parts of resin comprising oxidized abietic acid, and from approximately 37 to 51 parts of drying oil.

9. An article of manufacture comprising a flexible sheet material coated with a dried varnish film, said film before drying consisting substantially of a solution of a resinous composition comprising, by weight, from approximately 1 to 4 parts of oil-soluble phenol-aldehyde resin, from approximately 2 to 5 parts of resin comprising oxidized abietic acid, and from approximately 37 to 51 parts of drying oil.

10. An insulating tape comprising a dried and solvent-free band of cloth initially impregnated with a coating composition comprising a volatile solvent having dissolved therein a mass comprising, by weight, from approximately 1 to 4 parts of oil-soluble phenol-aldehyde resin, from approximately 2 to 5 parts of resin comprising oxidized abietic acid, and from approximately 37 to 51 parts of drying oil.

ARTHUR J. SHERBURNE.

CERTIFICATE OF CORRECTION.

Patent No. 2,146,598. February 7, 1939.

ARTHUR J. SHERBURNE.

It is hereby certified that error appears in the printed specification of the above numbered patent requiring correction as follows: Page 1, second column, line 45, Example I, for the numeral "49.3" read 49.8; and that the said Letters Patent should be read with this correction therein that the same may conform to the record of the case in the Patent Office.

Signed and sealed this 21st day of March, A.D. 1939.

Henry Van Arsdale.

(Seal)

Acting Commissioner of Patents.